United States Patent

Frohberger et al.

[11] 3,881,007
[45] Apr. 29, 1975

[54] COMBATING FUNGI WITH AROMATIC LACTAM-HYDRAZONES

[75] Inventors: Paul-Ernst Frohberger, Leverkusen; Arthur Botta, Krefeld, both of Germany

[73] Assignee: Bayer Aktiengesellschaft, Leverkusen, Germany

[22] Filed: July 9, 1973

[21] Appl. No.: 377,861

[30] Foreign Application Priority Data
July 18, 1972 Germany............................ 2235113

[52] U.S. Cl................................. 424/244; 424/274
[51] Int. Cl........................... A01n 9/14; A01n 9/22
[58] Field of Search .......... 424/274, 244; 260/313.1

[56] References Cited
OTHER PUBLICATIONS
Derwint Abstract 35571S-B of German Patent 1,957,783 11-17-69.

*Primary Examiner*—Albert T. Meyers
*Assistant Examiner*—Leonard Schenkman
*Attorney, Agent, or Firm*—Burgess, Dinklage & Sprung

[57] ABSTRACT

Fungicidally effective compositions containing, and methods of combating fungi using, aromatic lactam-hydrazones of the formula

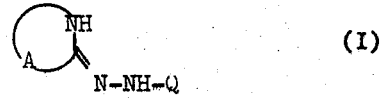

(I)

in which
A is optionally substituted alkylene, aralkylene or cycloalkylene, each of up to 20 carbon atoms, and
Q is optionally substituted mononuclear, dinuclear or trinuclear aryl, or optionally alkyl-substituted mononuclear or bi-nuclear heterocyclic aryl having 1 or 2 hetero-atoms, or their acid addition salts. The compositions also are microbicidal.

7 Claims, No Drawings

COMBATING FUNGI WITH AROMATIC LACTAM-HYDRAZONES

The present invention relates to and has for its objects the provision of particular new active compositions in the form of mixtures with solid and liquid dispersible carrier vehicles of certain aromatic lactam-hydrazones, some of which are new, and which possess valuable strong fungicidal and microbicidal properties, and methods for using such compounds in a new way, especially for combating and controlling fungi with other and further objects becoming apparent from a study of the within specification and accompanying examples.

As has long been known, zinc ethylene-1,2-bis-dithiocarbamate, (Compound A), in particular, is used as a fungicide in agriculture and in horticulture. That compound is of great importance amongst the commerically available products (compare R. Wegler, "Chemie der Pflanzenschutz- und Schaedlings-beka-empfungsmittel" ("Chemistry of Plant Protection Agents and Pesticides"), volume II, page 65, Berlin/-Heidelberg/New York (1970)). However, the effect is not always satisfactory if low concentrations are used.

It has now been found that lactam-hydrazone compounds which are lactam-hydrazones of aromatic systems of the general formula

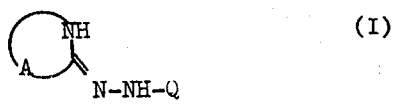

in which

A is optionally substituted alkylene, aralkylene or cycloalkylene, each of up to 20 carbon atoms, and Q is optionally substituted mononuclear, dinuclear or trinuclear aryl, or optionally alkyl-substituted mononuclear or bi-nuclear heterocyclic aryl having 1 to 2 hetero-atoms, or their acid additions salts, display strong fungicidal properties.

Preferably, A represents the alkylene grouping —$(CH_2)_n$—, which can optionally be substituted by at least one of $C_{1-6}$ alkyl and phenyl, n preferably being 2, 3, 5 or 11; and Q represents phenyl, chlorophenyl, nitrophenyl, dinitrophenyl, carboxyphenyl, sulfophenyl, amidosulfonylphenyl, or any of the radicals of the formulae

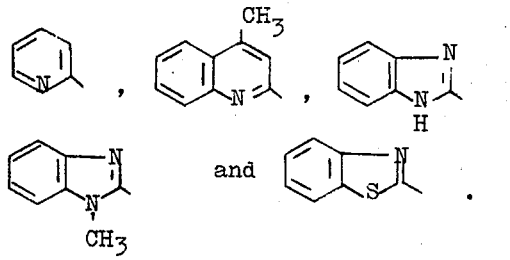

The compounds to be used according to the invention are present in a tautomeric equilibrium as follows:

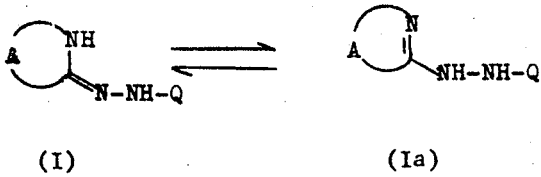

For reasons of simplicity, the formula of tautomer (Ia) will be dispensed with in the formulae which follow. For the purpose of the present application, the formulae which are given and correspond to the tautomer of the formula (I) are intended in each individual case also to encompass the corresponding formula of tautomer (Ia).

It is very surprising that the lactam-hydrazones of aromatic systems of formula (I) display a fungicidal action which is superior to the previously known active compound. The compounds to be used according to the invention therefore represent an enrichment of the art.

Examples of lactam-hydrazones of aromatic systems which are suitable for use as fungicides according to the present invention are 3,3-dimethylpropiolactam-(m-chlorophenyl-hydrazone), 3-phenylpropiolactam-(p-tolylhydrazone), butyrolactam-(m-fluorophenylhydrazone), 4,4-dimethylbutyrolactam(p-iodophenylhydrazone), valerolactam-(p-trifluoromethylphenylhydrazone), caprolactam-(o-bromophenylhydrazone), caprolactam-(o-, m- or p-chlorophenylhydrazone), caprolactam-(o-, m- or p-nitrophenylhydrazone), caprolactam-(3,4-dichlorophenylhydrazone), caprolactam-(2,4-dinitrophenylhydrazone), caprolactam-(p-methoxyphenylhydrazone), caprolactam-(m-ethylmercaptophenylhydrazone), 4-tert.-butyl-caprolactam-(m-dimethylaminophenylhydrazone), oenantholactam-(m-acetoxyphenylhydrazone), capryllactam-(p-benzoylthiophenylhydrazone), lauryllactam-(o-methylsulfonylphenylhydrazone), lauryllactam-(m-ethoxycarbonylphenylhydrazone), caprolactam(p-carbamoylphenylhydrazone), butyrolactam-(m-amidosulfonylphenylhydrazone), caprolactam-(m-carboxyphenylhydrazone), caprolactam-(4-sulfophenylhydrazone), naphthostyril-(2-chloro-6-methylphenylhydrazone), phenanthridone-(2,4,6-trichlorophenylhydrazone), morpholone-3-(m-nitrophenylhydrazone), octahydroquinolone-2-napht-hyl-(1)-hydrazone, caprolactamphenanthrylhydrazone, 2-oxo-5,6-benztetrahydroazepine-(m-chlorophenylhydrazone), 3-methylpropiolactam-(pyridal(2)-hydrazone), butyrolactam-(2,6-lutidyl-(4)-hydrazone), valerolactam-(quinolinyl-(3)-hydrazone), caprolactam-(4-methylquinolinyl-(2)-hydrazone), caprolactam-(pyrmidyl-2-hydrazone), oenantholactam-(s-triazinylhydrazone), capryl-lactam-(1,2,4-triazinyl-(3)-hydrazone), lauryllactam-(1-methylpyrazolyl-(3)-hydrazone), naphthostyril-imidazolyl-(2)-hydrazone, phthalimidine-benzimidazolyl-(5)-hydrazone, benzmorpholone-(5-chlorobenzimidazolyl-(2)-hydrazone), 1H-4-methyl-hexahydro-1,4-diazepin-2-one-thiazolyl-methyl-hexahydro-1,4-diazepin-2-one-thiazolyl-hydrazone, caprolactam-(1-methylbenzimidazolyl-(2)-hydrazone), and lauryllactam-benzthiazolyl-(2)-hydrazone.

The acid addition salts according to the invention may for example be derived from the following acids: hydrofluoric acid, hydrochloric acid, hydrobromic acid, hydriodic acid, optionally diluted perchloric acid, optionally diluted nitric acid, sulfuric acid, monomethylsulfuric acid, monoethylsulfuric acid, methanesulfonic acid, ethanesulfonic acid, propane sulfonic acid, butanesulfonic acid, butane-1,3-disulfonic acid, benzensulfonic acid, p-toluenesulfonic acid, p-chlorobenzenesulfonic acid, benzene-1,3-disulfonic acid, naphthalene-1-sulphonic acid, napthalene-2-sulfonic acid, cyclohexane-sulfonic acid, phosphoric acid, methylphosphonic acid, phenylphosphonic acid, tetrafluoboric acid, formic acid, acetic acid, chloroacetic acid, dichloroacetic acid, trichloroacetic acid, propionic acid, stearic acid, acrylic acid, lactic acid, citric acid, oxalic acid, malonic acid, succinic acid, malic acid, maleic acid, benzoic acid, p-chlorobenzoic acid, p-nitrobenzoic acid, phenylacetic acid, cinnamic acid and dihydrocinnamic acid.

Some of the lactam-hydrazones of aromatic systems to be used according to the invention are known (compare Chem. Abstr. 54, 24,712 c and Bull. Soc. Chim. France 1969 (10), 3,704–12, as well as German Offenlegungsschrift (German Published Specification) No. 1,957,783). Some of the active compounds are new. They can however be prepared according to methods which are known in principle; thus they are obtained if lactim-alkyl-ethers are reacted with arylhydrazines (compare Chem. Abstracts 54, 24,712 c (1960)); also, if arylhydrazines are heated with suitable reactive lactim derivatives in a solvent (compare German Offenlegungsschrift (German Published Specification) No. 1,957,783). The compounds can also be obtained according to a new process described in Application Ser. No. 377,862, filed July 9, 1973, which comprises the reaction of lactim-ethers with arylhydrazines in a polar solvent in the presence of a least catalytic amounts of an acid.

The active compounds according to the invention have strong fungitoxic properties and can therefore be used for combating harmful fungi. In addition to their high degree of effectiveness, these compounds also show a broad activity spectrum and are of relatively low toxicity to warm-blooded animals. For this reason they are non-hazardous to handle. Because of their low phytotoxicity they are in particular suitable for combating fungal diseases of plants.

The active compounds are especially suitable for seed dressings and also for the treatment of soil. Their action is primarily directed against seed-borne fungi and phytopathogenic soil fungi; in particular, there may be mentioned bunt diseases of cereals such as bunt of wheat and loose smut of oats, as well as helminthosporioses of barley and of oats, for example stripe disease of barley, and also diseases of seedlings, for example in cereals (including maize), legumes or cotton, which are caused by fungi, for example of the genera Rhizoctonia or Fusarium, such as *Fusarium nivale*.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as Freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroluem or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxide (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, albumin hydrolyzates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides, acaricides, rodenticides and fungicides, or bactericides, nematocides, herbicides, fertilizers, growth-regulating agents, etc., if desired, or in the form of particular dosage preparations for specific application made thereform, such as solutions, emulsions, suspensions, powders pastes, and granules which are thus ready for use.

In seed dressing, amounts of active compound of 50 mg to 50 g, preferably of 200 mg to 10 g, are in general used per kilogram of seed.

In soil treatment, which can be carried out over the entire area, in strips or at points, concentrations of 1 to 1,000 g of active compound per cubic meter of soil, preferably 10 to 200 g per cubic meter, are generally required.

Furthermore, the present invention contemplates methods of selectively killing, combating or controlling pests, e.g. fungi and microbes, which comprises applying to at least one of correspondingly (a) such fungi, (b) such microbes, and (c) the corresponding habitat thereof, i.e. the locus to be protected, a correspondingly combative or toxic amount, i.e. fungicidally or microbicidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, dry dressing, slurry dressing, moist dressing, wet dressing, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1:

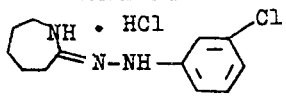

(1)

300 g of gaseous hydrogen chloride were introduced into a solution of 1,000 g (7 moles) of 3-chlorophenylhydrazine and 980 g (7.7 moles) of caprolactimmethyl-ether in 4,000 ml of methanol while stirring and cooling to 10°–20°C by means of an ice bath, and the reaction mixture was kept for a further hour at 20°C, brought to refluxing and kept at 65°C for 1½ hours. After cooling, the crystals which had separated out were filtered off and further crystal fractions were isolated by concentrating the mother liquors under reduced pressure. After recrystallization from 2 parts of methanol, 1,845 g (96% of theory) of caprolactam-(3-chlorophenylhydrazone)-hydrochloride were obtained as colorless crystals of melting point 280°–282°C. (The free base boiled at boiling point 0.08 180°C).

The following compounds were prepared in a similar manner:

| Formula | | Physical properties |
|---|---|---|
| (structure 2) | (2) | boiling point$_{0.15}$ 142 – 145°C |
| (structure 3) | (3) | boiling point$_{0.25}$ 170 – 175°C monohydrochloride: melting point 250 – 255°C (with decomposition) |
| (structure 4) | (4) | melting point 260°C (monohydrochloride) |
| (structure 5) | (5) | melting point 196°C monohydrochloride: melting point 256–258°C (with decomposition) |
| (structure 6) | (6) | boiling point$_{0.1}$ 125°C melting point 101°C monohydrochloride: melting point 244–246°C (with decomposition) |
| (structure 7) | (7) | boiling point$_{0.08}$ 180°C monohydrochloride: melting point 280-2°C monomethylsulfate: melting point 135°C p-toluenesulfonate: melting point 220°C |
| (structure 8) | (8) | melting point 260°C (with decomposition) |
| (structure 9) | (9) | melting point 158–159°C monohydrochloride: melting point 226°C (with decomposition) |

—Continued

| Formula | Physical properties |
|---|---|
| 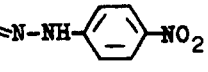 (10) | melting point 280°C (with decomposition) |
| (11) | melting point 190°C monohydrochloride: melting point 290°C (with decomposition) |
| (12) | melting point 152°C |
| (13) | melting point 220°C (with decomposition) |
| (14) | melting point >360°C |
| (15) | melting point 254–255°C |
| (16) | melting point 288–289°C |
| (17) | boiling point$_{0.5}$ 175–180°C melting point 133–135°C dihydrochloride: melting point 218–219°C |
| (18) | melting point 229°C dihydrochloride: decomposition point >245°C |
| (19) | melting point 186°C monohydrochloride: melting point 239–240°C |
| (20) | melting point 248–250°C |

—Continued

| Formula | Physical properties |
|---|---|
| (21) [structure: cycloheptyl =N-NH- benzothiazole] | melting point 147-148°C monohydrochloride: melting point 151-153°C |
| (22) [structure: (CH₂)₁₁ ring with NH, =N-NH-phenyl] | boiling point₀.₀₈ 177-180°C monohydrochloride: melting point 228°C |
| (23) [structure: (CH₂)₁₁ ring with NH, =N-NH-phenyl-NO₂] | melting point 157°C monohydrochloride: melting point 186-187°C |

In the following examples, 3A, 5A, 6A, 7A, 9A, 11A, 17A and 22A have reference to the hydrochlorides of compounds 3, 5, 6, 7, 9, 11, 17 and 22 respectively.

EXAMPLE 2:

Seed dressing test/snow mold (seed-born mycosis)

To produce a suitable dry dressing, the active compound was extended with a mixture of equal parts by weight of talc and kieselguhr to give a finely powdered mixture with the desired concentration of active compound.

To apply the dressing, rye seed naturally infected by *Fusarium nivale* was shaken with the dressing in a closed glass flask. Two batches of 100 grains of this seed were sown 1 cm deep in seed boxes containing Fruhstorfer standard soil. The young plants developed in climatic chambers at 10°C, at a relative atmospheric humidity of 95 percent and in diffused natural light; they showed the typical symptoms of snow mold within the first 3 weeks.

After this time, the number of *Fusarium*-infected plants was determined as a percentage of the total number of emerged plants. The smaller the number of diseased plants, the more effective was the active compound.

The active compounds, the concentrations of the active compounds in the dressing, the amounts of dressing used and the number of diseased plants can be seen from Table 1.

Table 1

Seed dressing test/snow mould

| Active compound | Active compound concentration in the dressing, in % by weight | Amount of dressing used in g/kg of seed | Number of plants infected with Fusarium, in % of the total number of emerged plants |
|---|---|---|---|
| without dressing | – | – | 14.6 |
| [Zn dithiocarbamate structure] (Known) (A) | 30 | 2 | 9.1 |
| [cycloheptyl =N-NH-phenyl-Cl · HCl] (1) | 30 | 2 | 2.3 |
| [cycloheptyl =N-NH-phenyl-Cl · HCl] (8) | 30 | 2 | 1.1 |
| [cycloheptyl =N-NH-phenyl-NO₂ · HCl] (10) | 30 | 2 | 0.0 |

EXAMPLE 3

Seed dressing test/stripe disease of barley (seed-born mycosis)

To produce a suitable dry dressing, the active compound was extended with a mixture of equal parts by weight of talc and kieselguhr to give a finely powdered mixture with the desired concentration of active compound.

To apply the dressing, barley seed naturally infected by *Helminthosporium gramineum* was shaken with the dressing in a closed glass flask. The seed, on moist filter paper discs in closed Petri dishes, was exposed to a temperature of 4°C for 10 days in a refrigerator. The germination of the barley, and possibly also of the fungus spores, was thereby initiated. Two batches of 50 grains of the pregerminated barley were subsequently sown 2 cm deep in Fruhstorfer standard soil and cultivated in a greenhouse at temperatures of about 18°C in seed boxes which were exposed to light for 16 hours daily. The typical symptoms of the stripe disease developed within 3 to 4 weeks.

After this time, the number of diseased plants was determined as a percentage of the total number of emerged plants. The fewer plants were diseased, the more effective was the active compound.

The active compounds, the concentration of the active compounds in the dressing, the amounts of dressing used and the number of diseased plants can be seen from Table 2.

Table 2

Seed dressing test/stripe disease of barley

| Active compound | Active compound concentration in the dressing in % by weight | Amount of dressing used in g/kg of seed | Number of plants suffering from stripe disease in % of the total number of emerged plants |
|---|---|---|---|
| without dressing | - | - | 30.9 |
| $\begin{matrix} CH_2-NH-C(=S)-S \\ | \\ CH_2-NH-C(=S)-S \end{matrix} Zn$ (known) (A) | 10 | 2 | 25.6 |
|  | 30 | 2 | 19.0 |
| cycloheptyl-NH·HCl, N-NH-phenyl (6A) | 30 | 2 | 1.3 |
| cyclopentadecyl-NH·HCl, N-NH-phenyl (22A) | 30 | 2 | 5.2 |
| cyclopentyl-NH·HCl, N-NH-phenyl (3A) | 30 | 2 | 0.0 |
| cycloheptyl-NH·HCl, N-NH-(2-Cl-phenyl) (1) | 3 | 2 | 5.3 |
|  | 10 | 2 | 1.4 |
|  | 20 | 2 | 0.0 |
|  | 30 | 2 | 0.0 |
| cycloheptyl-NH·HCl, N-NH-(4-Cl-phenyl) (8) | 3 | 2 | 5.1 |
|  | 10 | 2 | 1.0 |
|  | 30 | 2 | 0.0 |
| cycloheptyl-NH·HCl, N-NH-(4-NO$_2$-phenyl) (10) | 3 | 2 | 5.1 |
|  | 10 | 2 | 1.0 |
|  | 30 | 2 | 0.0 |
| cycloheptyl-NH·HCl, N-NH-(3-NO$_2$-phenyl) (9A) | 30 | 2 | 1.1 |
| cycloheptyl-NH·2HCl, N-NH-pyridyl (17A) | 30 | 2 | 14.6 |

Table 2 (continued)
Seed dressing test/stripe disease of barley

| Active compound | Active compound concentration in the dressing in % by weight | Amount of dressing used in g/kg of seed | Number of plants suffering from stripe disease in % of the total number of emerged plants |
|---|---|---|---|
| 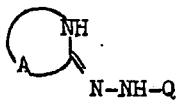 (4) | 30 | 2 | 1.0 |
| 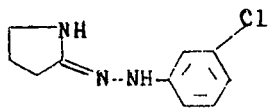 (11A) | 30 | 2 | 0.0 |
| 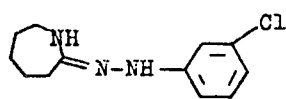 (5A) | 30 | 2 | 3.3 |

It will be appreciated that the instant specification and examples are set forth by way of illustration and not limitation, and that various modifications and changes may be made without departing from the spirit and scope of the present invention.

What is claimed is:

1. A method of combating fungi which comprises applying to such fungi or their habitat a fungicidally effective amount of a lactum hydrazone of the formula

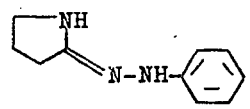

in which
A is $-(CH_2)_n$ - optionally substituted by at least one of $C_{1-6}$ alkyl and phenyl,
n is 2, 3, 5 or 11, and
Q is phenyl, chlorophenyl, nitrophenyl, dinitrophenyl, carboxyphenyl, sulfophenyl or amidosulfonylphenyl,
or its acid addition salt.

2. The method according to claim 1 wherein said compound is butyrolactam-3-chlorophenylhydrazone of the formula

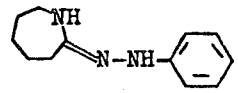

or its acid addition salt.

3. The method according to claim 1 wherein said compound is caprolactam-3-chlorophenylhydrazone of the formula

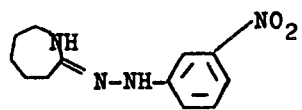

or its acid addition salt.

4. The method according to claim 1 wherein said compound is butyrolactam-phenylhydrazone of the formula

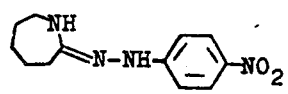

or its acid addition salt.

5. The method according to claim 1 wherein said compound is caprolactam-phenylhydrazone of the formula

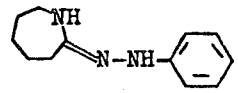

or its acid addition salt.

6. The method according to claim 1 wherein said compound is caprolactam-3-nitrophenylhydrazone of the formula

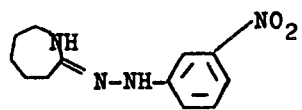

or its acid addition salt.

7. The method according to claim 1 wherein said compound is caprolactam-4-nitrophenylhydrazone of the formula

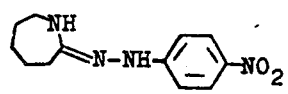

or its acid addition salt.

* * * * *